United States Patent Office 3,851,004
Patented Nov. 26, 1974

3,851,004
HYDROCARBON ALKYLATION PROCESS USING CATALYST REGENERATION
Chang-lee Yang, Ossining, N.Y., assignor to Union Carbide Corporation, New York, N.Y.
No Drawing. Filed Sept. 27, 1973, Ser. No. 401,178
Int. Cl. C07c 3/52
U.S. Cl. 260—671 C                                9 Claims

ABSTRACT OF THE DISCLOSURE

The activity of zeolitic hydrocarbon alkylation catalysts is maintainable for very long periods at commercially feasible levels by employing a Group VIII metal hydrogenation agent as a constituent of the catalyst composition and periodically hydrogenating the catalyst composition with a solution of hydrogen in a hydrocarbon solvent.

The present invention relates in general to a process for the alkylation of hydrocarbons using zeolite-containing catalysts and more particularly to aromatic or isoparaffin alkylation processes wherein the reaction is catalyzed by a zeolitic molecular sieve catalyst in conjunction with nickel or a platinum or a palladium group metal hydrogenation agent, the activity of the catalyst composition being maintained at a high level by periodic hydrogenation thereof.

Alkylation, as the term is commonly used in the petroleum industry, is either the reaction between an olefin and a branched chain paraffin to obtain a branched chain paraffin having a higher molecular weight than the isoparaffin employed as the initial reactant, or the addition of an olefin, such as propylene, to an aromatic ring compound such as benzene to form cumene.

Most present-day commercial alkylation processes employ large volumes of concentrated sulfuric and hydrofluoric acid catalysts which are immiscible with the hydrocarbon stream. Reactions are carried out in stirred-tank or tubular type reactors with strong mechanical agitation to emulsify the acid-hydrocarbon mixture. Reaction times up to 30 minutes are employed after which the emulsion is broken and the acid recovered and processed for recycle. Refrigeration systems are necessary to control temperature to below about 100° F., generally to below 80° F., during the highly exothermic reactions. At higher temperatures acid consumption increases and product quality is significantly reduced.

Alkylation processes with strong acid catalysts are fraught with difficulties, requiring careful control of many interrelated process variables for high-quality alkylate production. Consequently, isoparaffin alkylation and aromatic alkylation processes have more recently been proposed which utilize as heterogeneous catalysts large pore zeolitic molecular sieves treated to reduce their alkali metal cation content. Up to the present time there has been only a limited acceptance of such processes, principally because the molecular sieve catalysts, although highly active initially, undergo a rapid activity loss in on-stream use. It has been generally concluded that the rapid activity loss has been due to the accumulation of strongly adsorbed polymeric and polyalkylated hydrocarbons on the active surface of the catalysts. Various procedures have been proposed to cope with this problem such as, operation in the liquid phase, periodic washing with olefin-free paraffin or purging with inert gas at elevated temperatures and/or reduced pressure. However, only limited success has been achieved by these techniques.

It has now been discovered, however, that the initial activity of molecular sieve based catalysts can be maintained virtually indefinitely by periodic hydrogen treatment of the catalyst. In an improved alkylation process wherein an olefin feed is contacted and reacted with an alkylatable organic compound, either aromatic or isoparaffinic, in a catalytic conversion zone containing a catalyst composition comprising at least one hydrogenation agent of the group nickel, ruthenium, rhodium, palladium and platinum and a three-dimensional crystalline zeolitic molecular sieve having a pore diameter large enough to adsorb ortho-diethylbenzene, an alkali metal content of less than 3.5 weight percent on a solids basis, an $SiO_2/Al_2O_3$ molar ratio of at least 2, preferably greater than 3, said contact and reaction being continued until the alkylation activity of the catalyst has decreased, the improvement in accordance with the present invention which comprises periodically contacting and hydrogenating the catalyst composition, preferably in the absence of feed olefin, at a temperature of from 80° F. to 572° F. with a liquid solution of hydrogen in a saturated hydrocarbon having from 4 to 12 carbon atoms, said solution containing at least 0.1 mole percent dissolved hydrogen, until the alkylation activity is restored or at least substantially improved. The pressure conditions are not narrowly critical, but should be at least adequate to maintain the hydrocarbon solvent for the hydrogen in the liquid phase.

The crystalline zeolitic molecular sieves employed as one constituent of the catalyst composition of this invention are readily prepared from several synthetic crystalline zeolites well known in the art. Zeolite Y is especially preferred, but zeolite X, zeolite L, zeolite TMAΩ and acid treated, i.e., the hydrogen cation form of mordenite are also suitable as is the naturally occurring mineral faujasite. A complete description of the composition and method of prepaartion of zeolite X, zeolite Y, zeolite L and H-mordenite are to be found, respectively, in U.S. Pats. 2,882,244, 3,130,007, 3,216,789 and 3,375,064. Similar information regarding zeolite TMAΩ is disclosed in copending application Ser. No. 655,318, filed July 24, 1967. In those cases where the zeolitic molecular sieve starting material contains more than the permissible amount of alkali metal cations, such as sodium or potassium, the alkali metal cation content can be reduced by conventional ion exchange techniques whereby divalent, trivalent or tetravalent metal cations or monovalent nonmetallic cations such as hydrogen, ammonium, alkylammonium, and the like which can be thermally removed.

Preferably, in the typical case of zeolite Y which contains only sodium cations in the as-prepared state, the initial base exchange is carried out using an aqueous ammonium salt solution such as ammonium chloride, ammonium carbonate, ammonium sulfate or ammonium nitrate to the extent that the sodium cations are removed and replaced by ammonium ions to the extent that less than 3.5 weight percent (solids basis), remain. Thereafter, the zeolite is further contacted with an aqueous solution of one or more salts of polyvalent metal cations in proportions and of suitable concentration to exchange the desired equivalent percent of any residual sodium cations and/or ammonium cations for the polyvalent metal cations.

When the preferred zeolite Y has a $SiO_2$ to $Al_2O_3$ oxide molar ratio greater than 4 it is preferred that the alkali metal cation content of the finished catalyst is less than 0.25 and preferably less than 0.08 with respect to the equivalent mole ratio of the alkali metal oxide to aluminum oxide in the zeolite; however, it is not essential that polyvalent metal cations be present. Such zeolite compositions may be made by exchanging only a portion of the alkali metal of the original zeolite for thermally decomposable cations such as ammonium, alkylammonium or hydrogen, then heating at about 400° C. to 800° C., followed by further exchange of the alkali metal for such decomposable cations. These last introduced decomposable cations may then be decomposed to provide the low alkali metal cation form of the catalytic zeolite. This last calcination may optionally be the final calcination step in the catalyst preparation. This procedure for obtaining a low alkali metal cation content in a large pore crystalline zeolitic molecular sieve whereby 50 to 90 percent of the original alkali metal cations are exchanged for decomposable nonmetal cations and that intermediate is subjected to a thermal treatment above about 500° C. followed by further removal of the remaining alkali metal cations is known to increase the resistance of the zeolite's crystal structure to degradation at elevated temperature especially in the presence of water vapor. This double decationization procedure has also been called stabilization and the resulting low alkali metal cation zeolite product is sometimes referred to as an ultrastable form of the zeolite.

A preferred class of molecular sieves for use in the present process have a composition expressed in terms of mole ratios of oxides as:

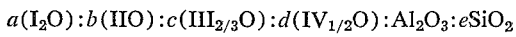

$a(I_2O):b(IIO):c(III_{2/3}O):d(IV_{1/2}O):Al_2O_3:eSiO_2$ wherein I represents a monovalent metal cation; II represents a divalent metal cation; III represents a trivalent metal cation; IV represents a tetravalent cation; "$a$" has a value of from zero to 0.25 preferably zero to 0.08; "$b$" has a value of from zero to 0.65; "$c$" and "$d$" each have values of from zero to 1; "$e$" has a value of from 2 to 20, preferably 4 to 15; with the proviso that when "$e$" has a value of from 2 to 3, the value of $(b+c)=0.75$ to 1, preferably 0.75 to 0.85, and $d=0$; and with the proviso that when "$e$" has a value of $>3$ to 4, the value of $(b+c+d)=0.6$ to 1.0, preferably 0.6 to 0.85. The monovalent cations represented by (I) in the zeolite composition formula of the immediately preceding paragraph are usually sodium or potassium or a mixture thereof, but other monovalent metal cations such as lithium, rubidium and cesium are permissible. The divalent metal cations represented by (II) are preferably selected from Group IIa of the Periodic Table (Handbook of Chemistry and Physics, 47th Edition, page B-3, Chemical Rubber Publishing Co., U.S.A.) especially magnesium, calcium, strontium and barium, but manganese, cobalt and zinc can also be used. The trivalent metal cations represented by (III) of the formula can be aluminum, chromium and/or iron, and/or the trivalent rare earth cations, lanthanium, cerium, praesodymium, neodymium, samarium, gadolinium, europium, terbium, dysprosium, holmium, erbium, thulium, ytterbium and lutetium. The tetravalent metal cations represented by IV are exemplified by thorium and cerium.

The Group VIII metals employed as hydrogenation agents, i.e., nickel, platinum, palladium, rhodium or ruthenium, can be used singly or in combination with each other or in combination with other metals having hydrogenation activity. The quantity of the Group VIII metals, specified above, present in the catalyst composition is not narrowly critical, but should be at least about 0.05 weight percent based on the weight of dehydrated zeolite. The upper limit in weight percent in the use of platinum, palladium, rhodium and ruthenium is usually set at about 2, mainly because of economic practically in view of the high cost of these metals and because larger amounts do not produce significantly improved results. Nickel, being relatively cheap, can be used, if desired, in greatly increased amounts, but more than about 20 weight percent imparts no further improvement to the process. The metal hydrogenation agents can be combined with the zeolitic molecular sieve by any of various techniques such as impregnation of the molecular sieve with a salt of the noble metal usually from a solution of the salt in a suitable aqueous or nonaqueous solvent or by an ion-exchange technique. When desired, the non-noble metal may also be incorporated by impregnation and/or adsorption of a decomposable compound, and/or by ion-exchange technique. Satisfactory methods for loading these metals on the molecular sieve are disclosed in U.S. Pats. 3,013,982, 3,013,987 and 3,236,762. The preferred technique for combining the Group VIII noble metal with the molecular sieve is that wherein an aqueous solution of the noble metal as an amine complex cation is employed in an ion-exchange method as disclosed in U.S. Pat. 3,200,082.

The combining of the metal hydrogenation agent with the molecular sieve may be done during or after the treatment of the zeolite for the purpose of modifying its original cation form to that corresponding to the active composition specified hereinabove or can be done after the zeolite has been diluted and bindered as described hereinafter. It has been found preferable to combine the hydrogenation metal with the zeolite during or after the last treatment wherein the alkali metal cation content of the zeolite is brought down to its final level. Thus, when the double decationization procedure is employed in the preparation of the zeolite specified composition, the hydrogenation metal or metals are preferably combined with the zeolite during or after the non-metal ion-exchange treatment for further alkali metal removal.

Thereafter, the molecular sieve combined with the hydrogenation metal is calcined in air at a temperature in the range of 400 to 800° C., preferably 450 to 650° C. This treatment converts the metal to an active form and drives off decomposition products from ammonium or other decomposable compounds that may be present from the cation exchanging and metal loading treatments. If desired, this calcination may be done after any catalyst pellet molding or tableting treatment such as are discussed hereinafter, with the further benefit of strengthening the catalyst body.

Except for the aforesaid Group VIII metal hydrogenation agent, it is not necessary to employ any additional or conventional catalysts or promoters in conjunction with the low alkali metal zeolitic molecular sieve in the practice of this invention but it is not intended that such compositions be necessarily excluded. Any catalytically active metal or compound thereof can be present either on the external surface or internal cavities of the zeolite or otherwise carried on diluents or binders used to form agglomerates of the catalyst. Suitable diluent materials in the catalyst composition include sintered glass, asbestos, silicon carbide, fire brick, diatomaceous earths, inert oxide gels such as low surface area silica gel, silica-alumina cogels, calcium oxide, magnesium oxide, rare earth oxides, alpha alumina and clays such as montmorillonite, attapulgite, bentonite and kaolin, especially clays that have been acid washed.

In the process for alkylating isobutane with an olefin using the catalyst of this invention, one can utilize a fixed catalyst bed, a moving bed or a fluidized bed and can use the aforesaid zeolite catalyst alone or in combination with prior known conventional catalysts. Similarly, although it is preferred to alkylate a relatively pure isobutane feed stock, isobutane as the major isoparaffin component, i.e., greater than 50 mole percent of the isoparaffin content of the feedstock to the reactor is isobutane, in combination with other isoparaffins can suitably be employed. The olefinic alkylating agent is preferably a butene, but ethylene, propylene and amylene alone, in admixture with each other, and/or butene can be used. In addition to the isoparaffin and olefin components, the feed stream can also include a non-reactive diluent such as nitrogen or methane. Although they are somewhat reactive in the alkylation process, normal paraffins such as n-butane, n-pentane or n-heptane can also be used as diluents in the feed stream. Due to the presence in the catalyst composition of a hydrogenation agent, it is found that hydrogen is too reactive to be used as a diluent in the olefin-containing feed. Accordingly the concentration of hydrogen in the feedstock should be kept as low as practically possible during the alkylation reaction step of the present process.

In the process for alkylating an aromatic ring compound with an olefin in accordance with a further embodiment of this invention, one can also use a fixed catalyst bed, a moving bed, or a fluidized bed and can use the aforesaid zeolite catalyst alone or in combination with prior known conventional heterogeneous catalysts, as in the case of isoparaffin alkylation. Alkylatable aromatic hydrocarbons suitably employed include benzene, toluene, the xylenes, ethylbenzene, the ethyltoluenes, the trimethyl benzenes, diethyl benzenes, triethylbenzenes, normal propylbenzene, isopropylbenzene, etc. as well as mixtures of the above. Higher molecular weight alkyl-aromatics are also suitable for use in the present process, including for example, hexylbenzenes, nonylbenzenes, dodecylbenzenes, hexyltoluenes, etc., and mixtures thereof. Hydrocarbon compounds containing condensed aromatic rings may be utilized in the process of the present invention, including such compounds as naphthalene, alkylnaphthalenes, anthracene, alkylanthracenese, phenanthrene, etc., and mixture thereof. The present inventive process may also be applied to alkylation of hydrocarbon compounds containing more than one aryl group, for instance diphenyl, diphenylmethane, triphenyl, triphenylmethane, etc. Preferred for use in the present inventive process are the benzenoid aromatic compounds, with benzene being particularly preferred.

Among the alkylating agents suitable within an embodiment of the present invention are mono-olefins, such as ethylene, propylene, 1-butene, 2-butene, isobutylene, the pentenes, the hexenes, etc. Also suitable as alkylating agents in the aromatic alkylation process embodiment are aliphatic alcohols, e.g. methanol and ethanol, alkyl halides, e.g. methyl chloride, and the like wherein the alkyl portion thereof has between one and 20 carbon atoms.

The precise method for introducing the alkylatable hydrocarbon and other reactants into the catalyst bed is not a narrowly critical factor provided the olefin concentration in the reaction zone remains low with respect to the alkylatable reactant. The reactants can be combined outside the catalyst bed, or more desirably provision is made to add olefin at various points along the bed. Such a procedure as the latter effectively decreases the tendency of the olefin to polymerize and subsequently crack under the influence of the catalyst with the consequent advantage of reducing coking and reducing the formation of undesirably large hydrocarbon molecules in the product alkylate. Such an arrangement also enables one to control the temperature in the catalyst bed of the highly exothermic reaction. Accordingly, the molar ratio of alkylatable compound to olefin in the reactor should be maintained within favorable range taking into account the particular catalyst, feedstock, temperature, pressure, WHSV etc. being utilized at any particular time. Such a range is readily established using routine skills within the art. As a general proposition molar ratios of alkylatable compound to olefin will be within the range of 1:1 to 50:1.

To a degree, the pressure and temperature conditions in the reactor are interdependent, specifically so that at least the alkylatable compound feed is in the liquid state and preferably both it and the olefin are in the liquid state. With this proviso, the suitable temperature range is from about 80° F. to 350° F. and the pressure commensurately from about 50 p.s.i.a. to 1000 p.s.i.a. The bed throughput of the reactant feed stream in terms of the overall weight hourly space velocity (WHSV) based on olefin is suitably maintained between 0.01 and 2, preferably from about 0.05 to about 1.0.

Although alkylation processes using heterogeneous zeolite-based catalysts have heretofore been proposed which utilize reaction temperatures as high as 500° C., it has been found that the nature of the hydrocarbonaceous deposit on the catalyst is dependent on the temperature to which the deposit is subjected. In order to prevent the formation of a highly refractory coke which cannot be adequately treated by the present process, temperatures in the reactor should not be permitted to exceed 350° C. for appreciable periods of time.

Periodically, when the alkylate product indicates an unacceptable level of alkylation activity for the catalyst, the catalyst is hydrogenated with a solution of hydrogen in a saturated hydrocarbon in the liquid state at a temperature of from 80° F. to 572° F. The concentration of hydrogen in the solvent is not a narrowly critical factor but since the solubility of hydrogen in most saturated hydrocarbons is rather low, it is preferred that the solution contain at least 0.1 mole percent dissolved hydrogen with total saturation of the solvent with hydrogen at the hydrogenation conditions being especially preferred.

The solvent for the hydrogen can be any normal, branched chain or cyclic saturated hydrocarbon having from about 4 to about 12 carbon atoms. In aromatic alkylation, the preferred solvent is cyclohexane or n-hexane whereas in isoparaffin alkylation isobutane or n-butane are preferred solvents.

The quantity of hydrogen solution used will of course be determined by such factors as the degree of improvement in catalyst activity desired, the degree to which the catalyst activity was allowed to decline prior to the hydrogenation treatment, the concentration of hydrogen in the solution, etc.

In the fixed bed and fluidized bed modes of the alkylation process the bed can be drained of void space hydrocarbons and the hydrogen solution passed through the bed either cocurrently or countercurrently. Although the precise nature of the chemical reactions occurring involving the zeolite, the hydrocarbonaceous coke deposit thereon and the hydrogen are not known, it has been established that hydrogen is consumed in the process, the alkylation activity of the catalyst is or can be restored to its initial level and the temperature of the hydrogenation operation is sufficiently low to prevent formation of a highly refractory coke which require oxidative "burn-off" regeneration techniques to completely restore the initial activity of the catalyst.

In the moving bed mode of the alkylation process of this invention, the hydrogenation of the catalyst composition is advantageously carried out outside the reaction zone portion of the bed, but it is not necessary to do so.

In a preferred embodiment of the present invention, the catalyst composition is washed with an alkylatable hydrocarbon, preferably the same compound being used in the alkylation reaction, the washing step being intermediate the alkylation reaction stage and the hydrogenation stage. The washing step has special advantage where the alkylation process is being carried out in a fixed bed reactor, since the washing liquid, fed either concurrently or countercurrently through the bed purges residual feed olefin from the bed. This prevents loss of olefin due to its being hydrogenated during the subsequent hydrogen treatment of the catalyst composition. Without being bound by an particular theory, it appears that the alkylatable wash compound is capable of, and does, chemically react with a part of the hydrocarbonaceous deposit on the zeolite catalyst, which deposit either directly inhibits the alkylation activity thereof or is a precursor of the deposit which in fact inhibits alkylation activity. Moreover the reaction product of the wash compound with the material deposited on the catalyst produces a desirable alkylate which can beneficially be admixed with the primary alkylate product of the process. Such a wash step is also advantageously interposed between the hydrogenation step and the next succeeding alkylation step.

The alkylatable hydrocarbon used as the washing agent is advantageously chosen with regard to the reactants employed in the particular alkylation process being carried out. In the case of an isoparaffin alkylation process the washing agent is preferably a normal or branched chain paraffin having from 4 to 9 carbon atoms and can include $C_4$ through $C_8$ cycloparaffins. Most preferred is isobutane or n-hexane. In the case of an aromatic alkylation process, the preferred washing agents are the aromatic alkylatable compounds described hereinbefore as suitable aromatic compounds for use in the alkylation reaction feedstock. Either class of washing agents can, however, be used in either the isoparaffin or aromatic alkylation process. Hydrocarbons containing olefinic or higher aliphatic unsaturation are not desirable washing agents.

The duration of the alkylation step and the hydrogenation step are interdependent, since the function of the hydrogenation step is to restore the catalyst activity compensatory with the loss of activity during the alkylation step. Thus, if during cyclic operation of alternating alkylation and hydrogenation steps it is found that the activity of the catalyst gradually declines, the hydrogenation step may be lengthened and/or the alkylation step shortened to maintain the activity. It has been found that a catalyst having reduced activity as a result of use in a process cycle not in close balance of alkylation and hydrogenation was restored to its full initial activity by an extended and/or more vigorous hydrogenation step.

The effectiveness of the alkylation process of the invention in preserving the alkylation activity of the catalyst for greatly extended periods of time was demonstrated by the comparative experiments set forth hereinafter. The apparatus in which these comparative experiments were done comprised nitrogen pressurized supply reservoirs to contain premixed feed of alkylatable compound and olefin and alkylatable compound alone in their liquid state, a metering pump to pass the feed mixture of alkylatable compound to a reactor, which was an electrically heated stainless steel vessel with inside dimensions of 2 1/16" diameter by 5 3/4" long to contain approximately 275 cc. of catalyst. Between the pump and the reactor a fitting was provided for introducing hydrogen or nitrogen. The effluent from the reactor passed through a pressure controlled valve to a product collector. The liquid from the product collector was transferred to a Vigreaux column fitted with a reflux head maintained at $-10°$ C. and a kettle maintained at $30°$ C. to vaporize any compounds as volatile as butane and thereby stabilize the alkylation reaction product.

The catalysts employed in the demonstration of the process of this invention were prepared from Type Y zeolite having $SiO_2$ to $Al_2O_3$ ratios of $4.8 \pm 0.2$ by the double decationization procedure. The hydrogenation agent was platinum and was added to the zeolite by treatment with aqueous platinum tetrammine solution after an ammonium cation exchange to further remove sodium cations following the thermal treatment of an 80 to 90 percent ammonium exchanged form of the starting Type Y zeolite. The low alkali metal zeolite was then wet blended with fine alumina in an amount to yield 18 to 22 weight percent alumina dilution in the finished catalyst, extruded through a 1/8" diameter die and calcined in air at $500°$ C. After charging to the reactor of the test system, the catalysts were brought up to a temperature of 365–390° C. over a period of 16 hours and maintained at this temperature for 2½ to 4 hours and cooled to the test temperature in a stream of hydrogen at one atmosphere pressure. The procedure in each Example was initiated by charging the reactor with a fresh lot of catalyst in the form of 1/8" diameter by about 1/4" long extruded pellets, purging with nitrogen gas, filling with the compound to be alkylated, adjusting the pressure and temperature, and then starting the process cycle.

Example 1

(A) Using the apparatus and procedure described immediately above and using 148 grams of the low-alkali metal zeolite Y based catalyst (containing 20 weight percent alumina diluent and 0.4 weight percent finely divided platinum metal prepared in accordance with the immediately preceding description), the process of the present invention is exemplified. The alkylation feedstock consisted of isobutane and butene in a weight ratio of 29 grams isobutane to 1 gram butene. The butene component was a blend of approximately 25 mole percent butene-1, 53 mole percent butene-2 and 22 mole percent isobutene. The feed rate of the feedstock to the reactor was 195 grams per hour and the operating temperature and pressure conditions in the reactor were $150°$ F. and 485 p.s.i.g. respectively. When 2.0 liters of feedstock had been fed to the reactor, the feed was terminated. 1.0 liter of a liquid solution of hydrogen obtained by adding 0.05 gram moles of hydrogen per 100 ml. isobutane at system pressure was fed through the reactor over a period of about 3 hours. The temperature of the reactor was maintained at $150°$ F. and at a pressure of 485 p.s.i.g. Thereafter 0.3 liter of isobutane containing no dissolved hydrogen was fed into the reactor over a period of about 1 hour and then a new cycle began by again introducing feedstock to the reactor. In all, 19 cycles as just described were carried out. Over the 19 cycles the yield of stabilized product ($C_5$ and higher hydrocarbons in the product) was 133 (100 x grams stabilized product per gram olefin fed to the reactor). Over the last 3 cycles the yield of stabilized product had increased to a highly desirable value of 136, i.e., the alkylation activity of the catalyst had actually improved.

(B) Using the same apparatus and feedstock as in part (A) of this Example, an alkylation process essentially the same as in part (A) was carried out except that a helium solution in isobutane was used instead of the hydrogen solution of part (A). In this procedure 2.1 liters of feedstock were fed into the reactor at the rate of 234 grams per hour. Thereafter the catalyst was washed by passing 1 liter of isobutane into the reactor at the rate of 0.41 liter per hour, followed by 1 liter of isobutane solvent with 0.2 gram moles helium at the rate of 0.4 liters of solvent per hour. Over the 6 such cycles the experiment was run, the average yield of stabilized product for the first 4 cycles was 170 whereas over the last 2 of the 6 cycles, the average yield of stabilized product had dropped to an unacceptable value of 73. The catalyst composition and quantity was the same as in the experiment of part (A) except that it contained 0.27 weight percent platinum. The temperature and pressure conditions were the same.

(C) To demonstrate that the hydrogenation component must be present in the catalyst composition, 147 grams of the catalyst of parts (A) and (B) but containing no metal hydrogenation component was used to alkylate the same feedstock as in parts (A) and (B). Using the same apparatus with the reactor temperature $150°$ F. and a pressure of 485 p.s.i.g., 2 liters of feedstock was fed to the reactor at the rate of 225 grams per hour. Thereafter the catalyst was washed first with 1 liter of isobutane at a feed rate of 0.4 liter per hour, then with 1 liter of a liquid solution of hydrogen obtained by adding 0.04 gram moles of hydrogen per 100 ml. isobutane at system pressure was fed through the reactor over a period 2.5 hours, and finally with 0.3 liters of isobutane at a rate of 0.4 liters per hour. Over the 6 such cycles the experiment was run, the average yield of stabilized product for the first 4 cycles was 183 whereas the average yield over the last 2 cycles was only 102.

It is apparent from the foregoing discussion and examples that the hydrogenation of a partially deactivated zeolitic alkylation catalyst containing a hydrogenation component with hydrogen in a hydrocarbon liquid produces an extraordinary improvement in its alkylation activity provided that the deactivating deposit is not permitted to become unduly refractory by exposure to temperatures in excess of $350°$ C.

What is claimed is:

1. In an alkylation process in which an alkylatable organic compound is contacted and reacted with an alkylation agent in a catalytic conversion zone containing a catalyst composition comprising at least one hydrogenation agent of the group of nickel, platinum, palladium, ruthenium and rhodium and a three-dimensional crystalline zeolitic molecular sieve having a pore diameter large enough to adsorb ortho-diethylbenzene, an alkali metal content of less than 3.5 weight percent on a solids basis, an $SiO_2/Al_2O_3$ molar ratio of at least 2.0, said contact and reaction being continued until the alkylation activity of the catalyst has decreased, the improvement which comprises periodically contacting and hydrogenating the catalyst composition at a temperature of from 80° F. to 572° F. with a liquid solution of hydrogen in a saturated hydrocarbon having from 4 to 12 carbon atoms, said solution containing at least 0.1 mole percent dissolved hydrogen, until the alkylation activity of the catalyst is improved.

2. Process according to claim 1 wherein the alkylation agent is a monoolefin containing from 2 to 5 carbon atoms and the alkylatable organic compound is isobutane.

3. Process according to claim 2 wherein the alkylation reaction between the olefin and the isobutane is carried out at a temperature of from 80° F. to 350° F. and at a pressure of from 0.01 to 1000 atmospheres.

4. Process according to claim 2 wherein the liquid solution of hydrogen is a saturated solution of hydrogen in isobutane.

5. Process according to claim 3 wherein the catalyst composition, at a time intermediate the period of its use in the alkylation reaction and the period of its treatment with a hydrogen solution, is washed with an alkylatable hydrocarbon in the liquid phase.

6. Process according to claim 5 wherein the alkylatable hydrocarbon used to wash the catalyst composition is isobutane.

7. Process according to claim 1 wherein the olefin feed is a monoolefin containing from 2 to 5 carbon atoms and the alkylatable organic compound is an aromatic compound.

8. Process according to claim 7 wherein the alkylation reaction between the olefin and the aromatic compound is carried out at a temperature of from 80° F. to 350° F. and at a pressure of from 0.01 to 1000 atmospheres.

9. Process according to claim 8 wherein the aromatic compound being alkylated is benzene or an alkyl substituted benzene.

References Cited
UNITED STATES PATENTS

| | | | |
|---|---|---|---|
| 3,644,565 | 2/1972 | Biale | 260—683.43 |
| 3,647,916 | 2/1972 | Caesar et al. | 252—414 |
| 3,795,714 | 3/1974 | Pickert et al. | 260—683.43 |

CURTIS R. DAVIS, Primary Examiner

U.S. Cl. X.R.

252—414; 260—683.43